INVENTORS
Kouichi Yoshimura
Masahiko Shioda

BY Stevens, Davis, Miller & Mosher
ATTORNEYS

OUTPUT VOLTAGE OF THE HALL EFFECT ELEMENT (mA)

CONTROL CURRENT (mA)

(a)

INVENTORS
Kouichi Yoshimura
Masahiko Shioda

BY
Stevens, Davis, Miller & Mosher
ATTORNEYS

United States Patent Office 3,507,111
Patented Apr. 21, 1970

3,507,111
ELECTRIC CLOCK
Kouichi Yoshimura, Kadoma-shi, and Masahiko Shioda, Hirakata-shi, Japan, assignors to Matsushita Electric Industrial Co., Ltd., Asaka, Japan, a corporation of Japan
Continuation of application Ser. No. 643,430, June 5, 1967. This application Oct. 1, 1968, Ser. No. 766,377
Claims priority, application Japan, June 7, 1966, 41/37,253; July 12, 1966, 41/46,303; Aug. 1, 1966, 41/51,292; Aug. 29, 1966, 41/57,467; Oct. 12, 1966, 41/67,745; Nov. 17, 1966, 41/75,998
Int. Cl. G04c 3/00
U.S. Cl. 58—23   1 Claim

ABSTRACT OF THE DISCLOSURE

An electric clock energizing means wherein the magnetic field induced by commercial power is detected by an antenna coil and the clock mechanism is driven in synchronism with the detected signal. The magnetic field detecting means includes an antenna bar having a coil wound thereon with a magnetic bias applied thereto. The magnetic bias is modulated by the magnetic field of the commercial power. Thus, the commercial power is detected by the electromotive force induced in the antenna coil whereby the detector may be of minimum dimensions with detection high in sensitivity.

---

This application is a continuation of application Ser. No. 643,430, filed June 5, 1967, which is now abandoned.

FIELD OF THE INVENTION

The present invention relates to an electric clock which detects energy of commercial frequency leaking in space by modulating the potential of a detecting means and synchronizing the detected signal to drive and control the driving source for a clock mechanism.

DESCRIPTION OF THE PRIOR ART

Generally, method of detecting a magnetic field leaking in space is to use an antenna coil. However, since commercial frequencies are as low as scores of c./s., the Q value of the antenna coil can not be made high so that the detecting sensitivity is low. This has made it difficult to put such a method into practical use.

SUMMARY OF THE INVENTION

The principal object of the present invention is to detect a signal of commercial frequency with high sensitivity by modulating the potential of the detecting means and to make possible practical use even of a weak magnetic field.

Another object of the present invention is to obviate the electromotive force caused by the velocity with which the clock mechanism moves and to obtain a stable operation such that the magnitude of the detected signal does not vary with the direction of the magnetic field.

Still another object of the present invention is to miniaturize the detecting means as much as possible.

DESCRIPTION OF THE PREFERRED EMBODIMENTS

Figure 1:
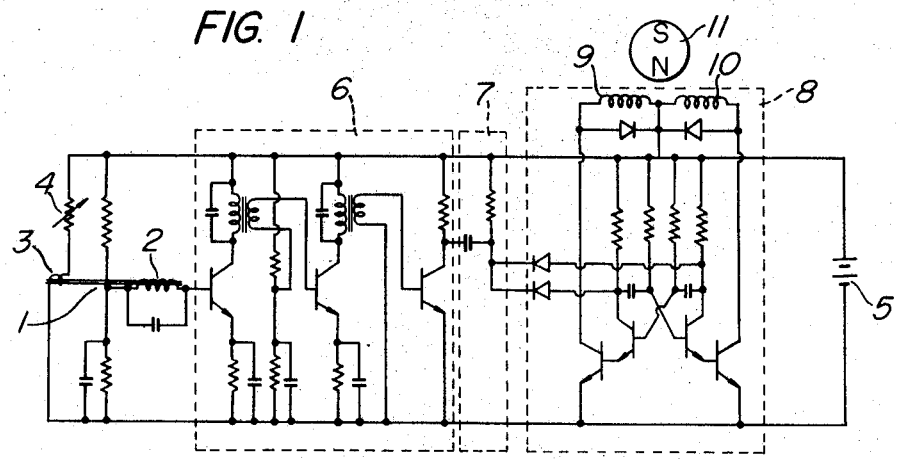
FIGS. 1, 2 and 3 show respectively the circuit construction, an antenna bar, and the curve of initial magnetization of said antenna bar embodying the present invention, wherein a D.C. bias coil is applied to said antenna bar.
Figure 2:
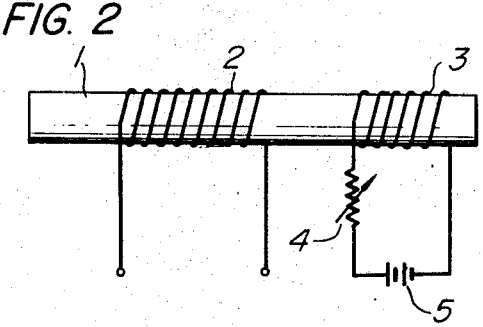
Figure 3:
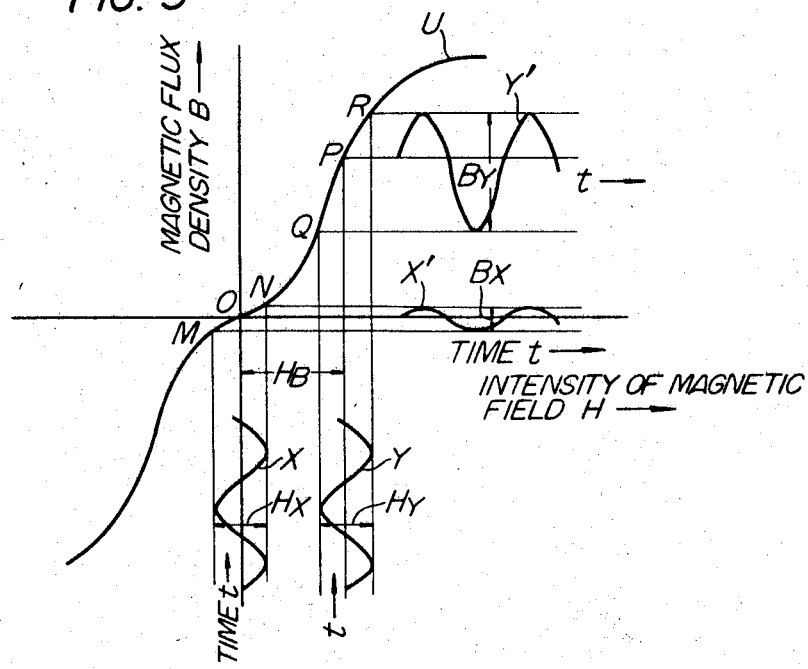

Detailed explanation of the embodiment of the present invention will be made hereinafter with reference to the accompanying drawings. FIGS. 1, 2 and 3 are provided to explain the detecting means which detects magnetic fields in space of commercial frequencies with a high detecting sensitivity to the magnetic field by applying a predetermined D.C. bias to an antenna bar. Numeral 1 shows the antenna bar and numeral 2 shows a detecting coil. On one end portion of the antenna bar is wound another bias winding 3, one end of which is connected to a terminal of a D.C. power source 5 through a variable resistor 4 and the other end thereof is connected to the other terminal of the D.C. power source 5 so as to apply a predetermined D.C. bias to the antenna bar 1.

In FIG. 3, the curve U shows the initial magnetization of the antenna bar 1. In the prior art where no D.C. bias is applied to the antenna bar, when a signal X having an amplitude Hx is generated due to a variation of the space magnetic field, the magnetization varies along the curve MN with its center located at the origin O and a variation of the magnetic flux density having an amplitude Bx is obtained. As is evident from FIG. 3, since the magnetization curve U is relatively flat near the origin O, the detecting sensitivity to such a small signal X as shown in this figure is not good. In order to use a steeper portion of the curve U the center point of operation is shifted to the point P by means of the winding 3, the variable resistor 4, and the D.C. power source 5 as shown in FIG. 2. The variable resistor 4 is provided so as to adjust the center point P of operation to the point where the maximum detecting sensitivity may be obtained.

In case a D.C. magnetic field bias $H_B$ is applied, if a signal having an amplitude Hy being equal to Hx is generated due to the variation of the magnetic field, the magnetization curve varies along the curve RQ with the point P as its center, yielding a signal Y' of the magnetic flux density variation having an amplitude By. Therefore, the detecting sensitivity to the space magnetic field is considerably increased.

FIG. 1 shows a circuit construction of the detecting means embodying the present invention, detecting the space magnetic field of commercial frequency in such a manner as described above and synchronizing the detected signal to drive the mechanism of the electric clock.

The explanation of the figure will be made as follows.

The signal detected by a detecting coil 2 is amplified by an amplifier 6 yielding an output of a square wave signal. This signal is differentiated by a differentiation circuit 7 and the pulse signal output thereof triggers an astable multivibrator 8 which is a driving source for a motor. To the outputs of the multivibrator 8 are connected field windings 9 and 10 (of the motor), to which a voltage having half the frequency of the commercial frequency is alternately applied. A permanent magnet rotor 11, connected to the gear of the clock mechanism, is rotated by means of this voltage, synchronizing the commercial frequency to drive the electric clock.

Figure 5:
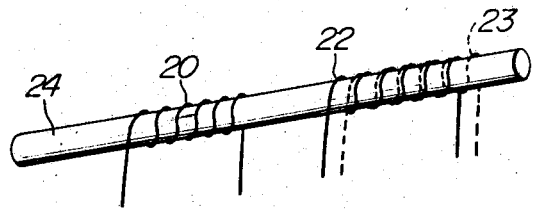
FIGS. 4, 5 and 6 show respectively the circuit construction, an antenna bar, and the magnetization curve of said bar embodying the present invention, wherein an A.C. bias coil is applied to said bar.
Figure 4:
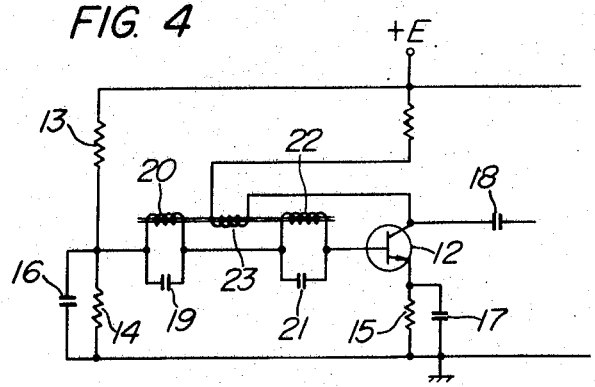
Figure 6:
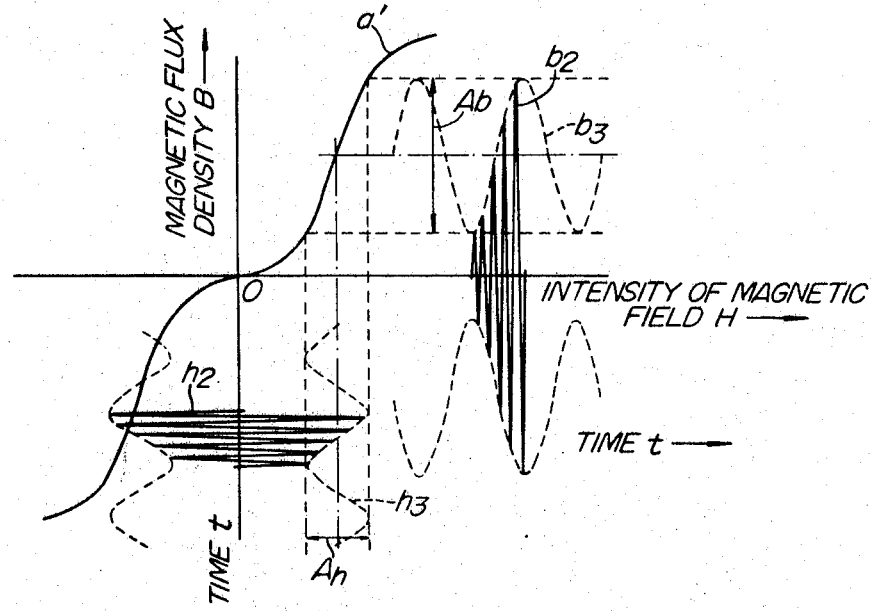

FIGS. 4, 5 and 6 are provided to explain the case where an A.C. bias is applied to the detecting coil.

Explanation will be made hereinafter regarding one embodiment with reference to these drawings. In FIG. 4, numeral 12 is a transistor, numerals 13, 14 and 15 are bias resistors for the transistor 12. Numerals 16 and 17 are bypass capacitors, and numeral 18 is a coupling capacitor. To the base circuit of the transistor are connected a capacitor 19 and a detecting coil 20 to detect the space magnetic field. Further, a coil 22 is connected in parallel to the capacitor 21 so that the resonant frequency thereof is within the range between several kc./s. and scores of kc./s. The resonant frequency is amplified by the transistor 12 and fed back positively to the base circuit through a feed back coil 23, thus forming an LC oscillation circuit.

The detecting coil 20, the high frequency generating coil 22, and the feed back coil 23 are wound around the same antenna bar 24. The space magnetic field of commercial frequency is detected by the resonance circuit formed by the capacitor 19 and the detecting coil 20 and the high frequency signal determined by the coil 22 and the capacitor 21 is modulated by the detected signal. The high frequency portion of the intensity of the magnetic field in the antenna bar 24 is modulated by the commercial frequency and varies as indicated by $h_2$ in FIG. 6. The envelope $h_3$ represents the signal of commercial frequency. The output signal is indicated by $b_2$ and the envelope $b_3$ represents the output of commercial frequency. By applying an alternating high frequency magnetic field bias the output signal of the magnetic flux density variation having an amplitude $A_b$ is derived from the space magnetic field of commercial frequency having an amplitude $A_h$. Since a steeper portion of the magnetization curve having a good linearity is used, the sensitivity is remarkably increased and at the same time the wave obtained is scarcely distorted.

Derivation of a signal of commercial frequency from the signal of high frequency is readily made by detection.

Figure 7:
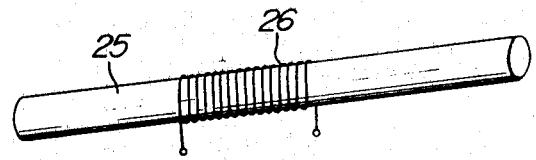
FIGS. 7 and 8 show respectively an antenna bar and the characteristic of the magnetization curve and the load line embodying the present invention, wherein a semihard magnetic material is used to detect a magnetic field in space.
Figure 8:
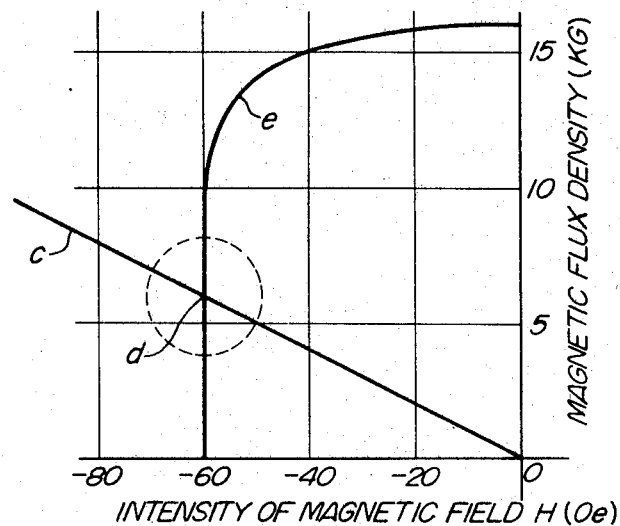

FIGS. 7 and 8 are provided to explain the case where the magnetic field of commercial frequency leaking in space is detected by a semihard magnetic material (lead alloy or CS Magnet, namely a material having intermediate magnetic permeability and coercive force characteristics. As shown in FIG. 7, the antenna coil 26 is wound around the antenna bar 25 made of a semihard magnetic material.

The antenna bar made of a semihard magnetic material is premagnetized. The point of intersection $d$ between the load line $c$ and the magnetization curve $e$ corresponds to the working point. In effect, a magnetic field bias being equivalent to the aforementioned D.C. or A.C. bias is applied. Since a steep portion of the magnetization curve is used, the detecting sensitivity can be remarkably increased.

Further, FIGS. 9 to 13 are provided to explain the case where an element sensitive to a magnetic field such as a magnetic resistance effect element or a Hall effect element is used to detect the alternating magnetic field of commercial frequency leaking in space and the detected signal is used as a controlling signal to drive the clock mechanism.

Figure 9:
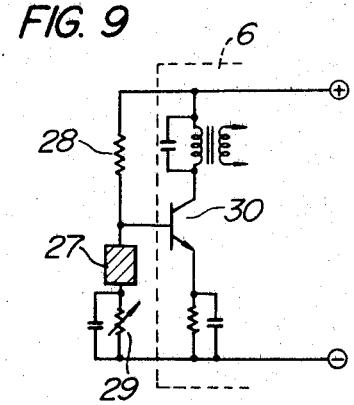
FIGS. 9 and 10 show respectively the circuit construction, and the characteristic of a magnetic resistance effect element embodying the present invention.

In FIG. 9, numeral 27 is a magnetic resistance effect element. Numerals 28 and 29 are provided to adjust the working point of the transistor 30 and the current flowing through the magnetic resistance effect element. The magnetic field of commercial frequency detected by the element 27 is introduced to the amplifier 6 in the same way as shown in FIG. 1.

Figure 10:
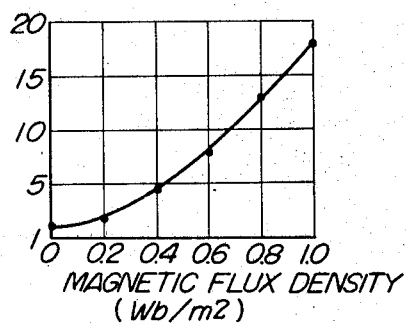

FIG. 10 shows the characteristic of the magnetic resistance effect element. It is seen that the electric resistance thereof varies with the magnetic flux density of the space magnetic field detected by this magnetic resistance effect element.

When the magnetic resistance effect element is used as a detecting means, a stable operation may be obtained because the element does not generate the speed electromotive force due to the velocity with which the clock is moved. Moreover, since the element detects the variation of the magnetic field independently of the direction thereof, the clock may be moved in a desired direction. The detecting means can be made extremely smaller in comparison with that according to the conventional method using an antenna coil.

Figure 11:
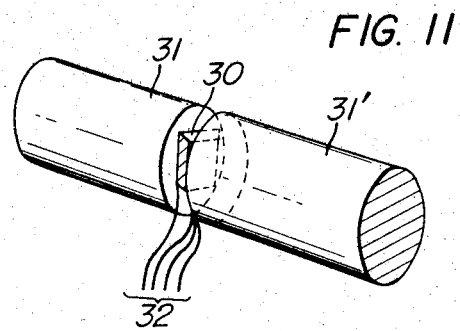
FIG. 11 shows bars of magnetic substance according to the present invention having a Hall effect element therebetween.

FIGS. 11, 12, 13a and 13b are provided to explain the case where a Hall effect element instead of a magnetic resistance effect element is used for the detecting means. Th electromotive force generated by the Hall effect element varies with the variation of the magnetic flux density. In FIG. 11, numeral 30' shows the Hall effect element, on both sides of which bars 31 and 31' of magnetic substance having a high magnetic permeability and a large saturated magnetic flux density are adhered by an adhesive agent such as Araldite. Numeral 32 shows the lead wires for the input and the output terminals of the Hall effect element 30'.

The magnetic bars 31 and 31' are provided so as to concentrate the magnetic lines of force and increase the intensity of the magnetic field applied to the Hall effect element, thereby increasing the detecting sensitivity. FIGS. 13a and 13b show the difference in the intensity of the magnetic field between both cases, with and without the magnetic bars 31 and 31' placed in a uniform magnetic field. FIG. 13a shows the density of the magnetic line of force for the case where the magnetic bars 31 and 31' according to the present invention are not provided and FIG. 13b shows that where they are provided.

Figure 12:
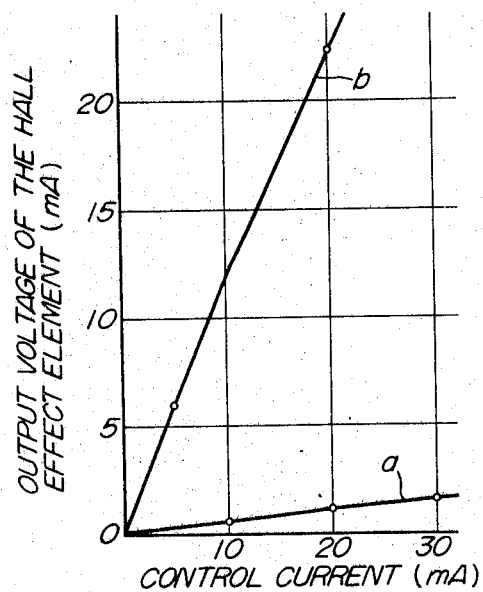
FIG. 12 shows the characteristic of the Hall effect element with and without the magnetic substance according to the present invention.
Figure 13:
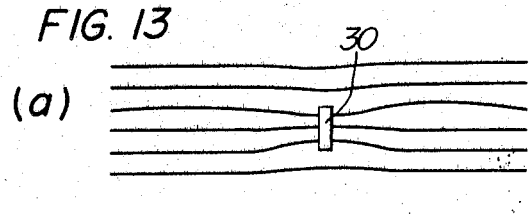
FIGS. 13a and 13b show the intensity of a magnetic field with and without the magnetic substance respectively according to the present invention.
Figure 13:
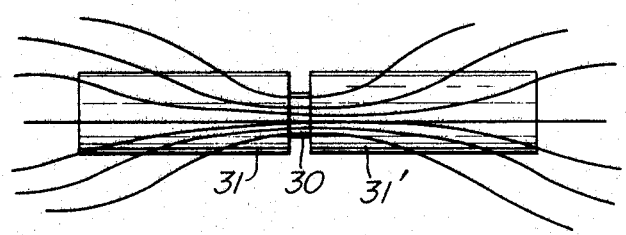

FIG. 12 shows the characteristic of the output voltage of the Hall effect element with and without the magnetic bars according to the present invention, i.e., symbol ($b$) shows the characteristic for the case where the magnetic bars 31 and 31' having a radius greater than 1 cm. and a length of 5 cm. are provided on both sides of the Hall effect element having a radius of 1 cm., and symbol ($a$) shows the characteristic for the case where they are not provided. The above explanation has been made with regard to one of the various arrangements attempted in order to increase the detecting sensitivity using a Hall effect element for the detecting means.

Figure 14:
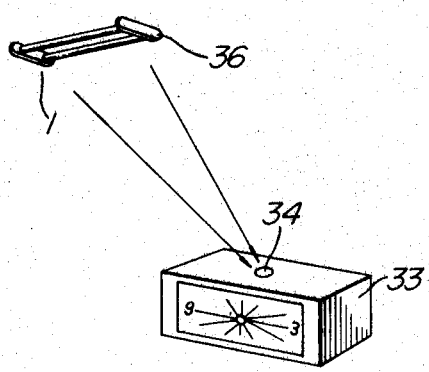
FIGS. 14 and 15 show an electric clock using a phototransistor to detect the light from a light source of commercial frequency.
Figure 15:
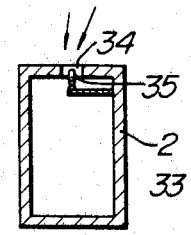

A phototransistor, a photoconductive cell, a phototube, and a photocell may be used to detect the light of a fluorescent lamp of an incandescent lamp, etc., energized by a power source of commercial frequency. FIGS. 14 and 15 show a particular example, wherein a phototransistor is used. In FIGS. 14 and 15, it is seen that a small hole is drilled in the top side of the clock 33. The phototransistor 35 is placed in the center of the hole 34 to receive the light from a light source 36 and derive a variation of current from the light energized by the light source of commercial frequency.

Therefore, according to the present invention, the energy of commercial frequency leaking in space is picked up and detected by modulating the potential of the detecting means, thereby driving and controlling the driving source of the clock mechanism. Even if the energy of commercial frequency leaking in the space is extremely small, the energy is detected effectively and the driving source of the clock is accurately driven and controlled.

Further, the present invention is characterized by the fact that the detecting means may be miniaturized since a magnetically sensitive or a photosensitive element is used to detect the energy of commercial frequency leaking in the space and that a stable operation is made pos-

We claim:

1. A cordless electric clock comprising means for detecting the induced magnetic field of a commercial frequency in space, said means comprising an antenna bar comprised of magnetic substance made of a semihard magnetic material, a detecting coil wound on said bar, and a magnetic bias applied to said bar, said means being adapted to detect said field by an electromotive force induced in said antenna coil by modulating said magnetic bias by said field, means to amplify the detected signal of said commercial frequency, motor driving means operatively connected to the output of said amplifying means to be driven in synchronism with the output signal of said amplifying means, an electric motor driven by said driving means, and a clock mechanism driven by said motor.

References Cited

UNITED STATES PATENTS

| | | | |
|---|---|---|---|
| 2,786,972 | 3/1957 | Dreier et al. | 318—16 |
| 2,976,470 | 3/1961 | Krassoievitch et al. | 58—23 |
| 2,252,059 | 8/1941 | Barth | 340—197 |
| 2,741,757 | 4/1956 | Davol et al. | 340—197 |
| 3,163,978 | 1/1965 | Kohlhagen | 58—23 |
| 3,169,218 | 2/1965 | Reich | 58—23 |

RICHARD B. WILKINSON, Primary Examiner

E. C. SIMMONS, Assistant Examiner

U.S. Cl. X.R.

318—16